(12) United States Patent
Kausch et al.

(10) Patent No.: US 7,794,780 B2
(45) Date of Patent: Sep. 14, 2010

(54) STATIC DISSIPATIVE OPTICAL CONSTRUCTION

(75) Inventors: William L. Kausch, Cottage Grove, MN (US); James E. Lockridge, Maplewood, MN (US); Wade D. Kretman, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1160 days.

(21) Appl. No.: 11/279,119

(22) Filed: Apr. 10, 2006

(65) Prior Publication Data

US 2006/0164783 A1 Jul. 27, 2006

Related U.S. Application Data

(62) Division of application No. 10/436,377, filed on May 12, 2003, now Pat. No. 7,041,365.

(51) Int. Cl.
*B32B 7/02* (2006.01)
*B32B 27/08* (2006.01)
*B32B 27/34* (2006.01)
*B32B 27/36* (2006.01)
*B05D 5/12* (2006.01)

(52) U.S. Cl. .......... 427/58; 427/299; 427/322; 427/331; 427/335; 427/402; 427/407; 427/412.1; 427/412.2; 427/412.3; 427/412.4; 427/412.5; 428/212; 428/412; 428/451; 428/423.1; 428/473.5; 428/474.4; 428/480; 428/522; 428/523; 428/334; 428/336; 428/339

(58) Field of Classification Search .......... None
See application file for complete search history.

(56) References Cited

U.S. PATENT DOCUMENTS

| | | | | |
|---|---|---|---|---|
| 4,098,952 | A | | 7/1978 | Kelly et al. |
| 4,701,403 | A | * | 10/1987 | Miller .......... 430/529 |
| 4,898,921 | A | * | 2/1990 | Humphrey et al. .......... 527/300 |
| 4,916,011 | A | * | 4/1990 | Miller .......... 428/341 |
| 5,033,253 | A | | 7/1991 | Havens et al. |
| 5,064,699 | A | | 11/1991 | Havens et al. |
| 5,122,404 | A | | 6/1992 | Fowler |
| 5,171,641 | A | | 12/1992 | Roberts et al. |
| 5,284,741 | A | * | 2/1994 | Tachibana et al. .......... 430/529 |
| 5,286,618 | A | * | 2/1994 | Tachibana et al. .......... 430/529 |
| 5,300,575 | A | | 4/1994 | Jonas et al. |
| 5,310,640 | A | | 5/1994 | Markin et al. |
| 5,312,681 | A | * | 5/1994 | Muys et al. .......... 428/323 |
| 5,336,659 | A | | 8/1994 | Bauer et al. |

(Continued)

FOREIGN PATENT DOCUMENTS

EP 0901093 3/1999

(Continued)

OTHER PUBLICATIONS

Baytron® Coating Guide Formulations: CPUD2 (Baytron Conductive Polyurethane Dispersion II), 2-pages printed from Internet on Mar. 5, 2003. H.C. Starck E-Chemicals: Baytron Coating Guide Formulations.

(Continued)

*Primary Examiner*—Vivian Chen

(57) ABSTRACT

A method of making an optical construction that is static-dissipative and includes a static-dissipative layer buried within optical material.

17 Claims, 1 Drawing Sheet

U.S. PATENT DOCUMENTS

| | | | |
|---|---|---|---|
| 5,354,613 A * | 10/1994 | Quintens et al. | 428/341 |
| 5,391,472 A | 2/1995 | Muys et al. | |
| 5,500,457 A | 3/1996 | Sarkar et al. | |
| 5,604,083 A * | 2/1997 | Valsecchi et al. | 430/528 |
| 5,796,256 A | 8/1998 | Fowler et al. | |
| 5,908,847 A | 6/1999 | Eck | |
| 5,925,438 A * | 7/1999 | Ota et al. | 428/141 |
| 5,968,871 A | 10/1999 | Katashima et al. | |
| 6,017,610 A | 1/2000 | Abe et al. | |
| 6,068,794 A | 5/2000 | Kobayashi et al. | |
| 6,162,596 A * | 12/2000 | Schwark et al. | 430/529 |
| 6,201,051 B1 * | 3/2001 | Mager et al. | 524/261 |
| 6,225,040 B1 | 5/2001 | Muys et al. | |
| 6,248,818 B1 | 6/2001 | Kim et al. | |
| 6,286,684 B1 | 9/2001 | Brooks | |
| 6,521,346 B1 * | 2/2003 | Wang et al. | 428/432 |
| 6,660,388 B2 * | 12/2003 | Liu et al. | 428/421 |
| 6,660,389 B2 * | 12/2003 | Liu et al. | 428/421 |
| 7,041,365 B2 * | 5/2006 | Kausch et al. | 428/212 |
| 2001/0011779 A1 | 8/2001 | Stover | |
| 2001/0013668 A1 | 8/2001 | Neavin et al. | |
| 2001/0019182 A1 | 9/2001 | Hebrink et al. | |
| 2002/0075580 A1 | 6/2002 | Kubota | |
| 2002/0114960 A1 | 8/2002 | Mager et al. | |

FOREIGN PATENT DOCUMENTS

| | | |
|---|---|---|
| EP | 0999242 | 5/2000 |
| EP | 1102108 | 5/2001 |
| EP | 1228861 | 8/2002 |
| JP | 61287743 | 12/1986 |
| JP | 08-286004 | * 11/1996 |
| JP | 8286004 | 11/1996 |
| JP | 8334622 | 12/1996 |
| JP | 10311901 | 11/1998 |
| JP | 2000056115 | 2/2000 |
| JP | 2003039586 | 2/2003 |
| WO | WO 99/36813 | 7/1999 |
| WO | WO 00/73393 | 12/2000 |
| WO | WO 01/07339 | 2/2001 |
| WO | WO 01/26081 | 4/2001 |
| WO | WO 01/38448 | 5/2001 |

OTHER PUBLICATIONS

Baytron® Coating Guide Formulations: Component Information and List of Suppliers, 3 pages printed from internet on Mar. 5, 2003. H.C. Starck E-Chemicals: Baytron Coating Guie Formulations.

H.C. Starck Baytron® Coating Guide, Issue Oct. 2002, pp. 1-12.

Electro-Tech Systems, Inc.—Model 803B—Resistance/Resistivity Probe, 2 pages printed from Internet on Mar. 19, 2003.

Electro-Tech Systems, Inc.—Model 872—Wide Range Resistance Meter, 2 pages printed from Internet on Mar. 19, 2003.

Static Decay Meter, Model 406D, product literature from Electro-Tech Systems, Inc., 2 pages.

ASTM Designation: D257 99, "Standard Test Methods for DC Resistance or Conductance of Insulating Materials, " 18 pages.

Department of Defense, Test Method Standard, Test Procedures for Packaging Materials, Mar. 13, 1980.

* cited by examiner

STATIC DISSIPATIVE OPTICAL CONSTRUCTION

CROSS REFERENCE TO RELATED APPLICATIONS

This application is a divisional of U.S. Ser. No. 10/436,377, filed May 12, 2003, now U.S. Pat. No. 7,041,365, the disclosure of which is herein incorporated by reference.

TECHNICAL FIELD

This invention relates to optical films, and more particularly to static dissipative optical constructions and articles having buried static-dissipative layers.

BACKGROUND

Optical films such as those used in liquid crystal displays, glazings, and other laminates and layered products demand high light transmissivity and ultra-clean appearance. Defects such as particles, non-planar topography, and disproportionate degree of contact (sometimes referred to as "wet-out") that are present in an optical film(s), however, can result in undesirable malappearances, and can be detrimental to the light transmission, the brightness enhancement function or clarity of the product. These defects can be, in part, a result of static charges that are introduced by manufacturing, converting or assembly processes.

For example, static charges can result from a tape (e.g. masking) or other film that is quickly pulled or peeled away from the target substrate/film during processing. These static charges can subsequently attract particles that may be near the surface of a film. Particles that eventually land or become anchored on the film can lead to unwanted light blockages, refracting, or absorbance, depending on the film's original purpose. A non-planar topography can be the result of non-uniform shrinkage, warping, or expansion of a film, particularly when an area of the film is pinched or mechanically held in place while movement or creep occurs with another portion of the film. Another cause, however, may be static charges that can create the pinched or stationary area, causing binding between film layers and consequently lead to non-uniform or non-synchronized film changes. The optical defect known as the "wet-out" phenomenon can occur when differences in optical transmission exist between two regions, or when interference patterns such as "Newton's rings" are observed. (The defect is minimally detectable when the wet-out is uniform throughout a film product.) Static charges can contribute to non-uniform attraction of particular areas between two layered films, causing wet-out.

Conductive compositions have been developed since the introduction of conductive polymers such as polyethylenedioxythiophene (PEDT). Some conductive polymers are dispersible in water and alcohol, rendering them a popular choice for conductive coating compositions. Applying these compositions onto films (e.g. on the surface) are known to impart anti-static properties even in the absence of significant ambient humidity. "Anti-static" or static dissipative materials with these surface coated conductive compositions are typically characterized as having a surface resistivity of less than about $1 \times 10^{12}$ ohms/square and a static decay time of less than about 2 seconds.

Some conductive compositions, however, may have limited light transmissivity, likely due to their highly colored nature, and therefore have limited use in certain optical film products that require high transmissivity and clarity, such as optical-grade display films. Moreover, some polymeric coatings can be susceptible to mechanical abrasion and other undesirable or optically disruptive effects when left unprotected. Such mechanical disruptions can be quite detrimental for optical articles. For example, a smudge or scratch on a polymeric coating can result in an undesirable effect when the article is a computer display.

Static dissipative materials have been developed for industries such as carpets, electronics, (e.g., IC wafers, sensors, semiconductors) and packaging. Currently, materials developed for these applications rely on conductive compositions coated onto a surface of a material and left exposed to the environment, or materials that have anti-static agents within its composition, such as by extrusion of a bulk composition pre-blended with an anti-static agent, or by penetration, absorption, or migration of an antistatic agent into the composition. There are antistatic agents that require some amount of water (humidity) to be effectively static dissipative. These are typically the ionic type of antistatic agents which rely on ionic mobility for the dissipative mechanism. Their effectiveness, however can be reduced as a function of humidity—i.e. as relative humidity decreases, the static dissipative ability decreases. Typically, at relative humidities less about 20% RH, ionic anti-static agents may not be effective.

It is therefore desirable to provide an optical article that can be static dissipative even when a conductive or anti-static coating has been buried (e.g. protected) by non-conductive material(s), and also be static dissipative in lower humidity environments. Optical articles that can be both static dissipative and still capable of maintaining desired levels of light controlling ability are also needed. Processes for manufacturing optical-grade constructions and articles with minimal defects caused by static charges would be beneficial.

SUMMARY

The invention provides constructions and articles that are static-dissipative. Embodiments of the invention are optical constructions that include an optical layer having a static-dissipative layer and an overlay of another optical layer.

In an aspect, an optical construction can be substantially static dissipative even when a static-dissipative component or layer is positioned between at least two optical materials. The constructions can exhibit a surface resistivity greater than about $1 \times 10^{12}$ ohms/square yet remain static-dissipative. An optical construction can have a static decay time of less than about two seconds. Exemplary constructions are sufficiently static-dissipative so that the effects of static charges can be negated, where the charges are present on or near the surface of the article.

In a further aspect, optical constructions provided herein are effective in dissipating static charges in environments having lower relative humidity.

In accordance with another aspect of the invention, a process is provided for making a static-dissipative optical construction. Techniques such as co-extrusion and lamination can be implemented.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION OF EMBODIMENTS

Constructions according to embodiments of the invention can exhibit higher resistivity values, yet sustain effective levels of static-dissipative capability. For clarity, it is noted that although the term "conductive" is often used in the industry to refer to "static dissipative," use of these terms herein are not intended to be synonymous. Specifically, a conductive material is considered to have a surface resistivity up to $1 \times 10^5$ ohms/sq, whereas a static-dissipative material typically would have a surface resistivity up to $1 \times 10^{12}$ ohms/sq. These terms are generally used to describe materials having a conductive or static-dissipative component or agent on an exposed surface of the material. It has been surprisingly found, however, that constructions having a static-dissipative layer "buried" between layers of substantially non-static-dissipative components can be static-dissipative, even though the constructions exhibit higher levels of surface resistivity. Furthermore, the static decay times can be maintained even with these higher surface resistivity values.

In accordance with exemplary embodiments of the invention, optical constructions and articles are provided that are substantially static dissipative. The constructions can maintain and be effectively static-dissipative irrespective of the relative humidity in which they are used or prepared. For example, low humidity levels (e.g. below 15% RH) will not affect the static-dissipative properties of the optical constructions. Thus, advantageously, an amount of moisture need not exist for the constructions to acquire or maintain their static-dissipative property. The optical constructions are also static-dissipative even in the absence of circuitry (e.g., wires) connected to the static-dissipative layer. Exemplary constructions of the invention exhibit sufficient static dissipation ability to prevent dust, dirt, and other particles from adhering to the surface(s) of the optical construction. Surprisingly, certain constructions according to the invention can exhibit a surface resistivity greater than about $1 \times 10^{12}$ ohms/sq., and exemplary constructions can have even greater surface resistivity, such as greater than about $1 \times 10^{13}$ ohms/sq., yet maintain their static dissipation ability. Embodiments of the invention exhibit static decay times of less than about 2 seconds. Other inventive constructions can exhibit static decay times of less than about 0.5 seconds, while further embodiments can have static decay times of less than about 0.1 seconds.

Figure 1:
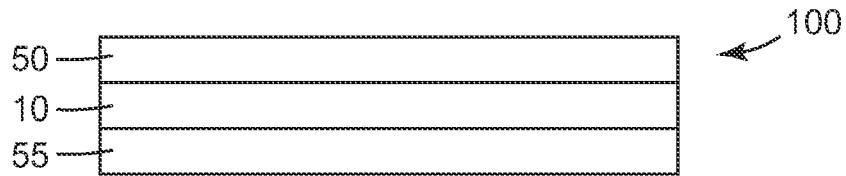
FIG. 1 is a cross-sectional schematic of an embodiment according to the invention.
Figure 2:
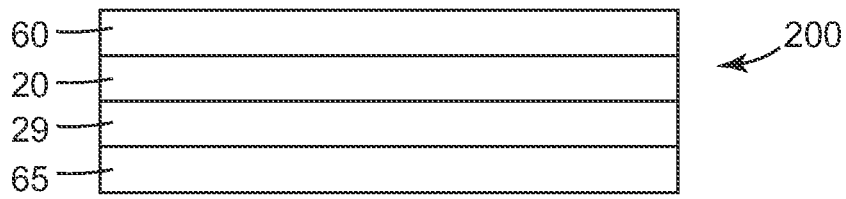
FIG. 2 is a cross-sectional schematic of a further embodiment of the invention, where an optical layer comprises multiple layers.
Figure 3:
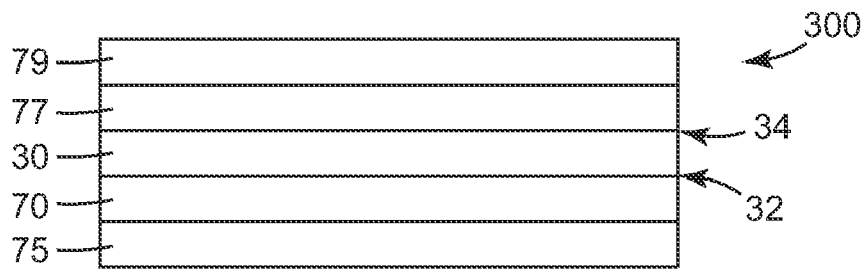
FIG. 3 is a cross-sectional schematic of yet another embodiment of an optical construction having multiple optical layers.
Figure 4:
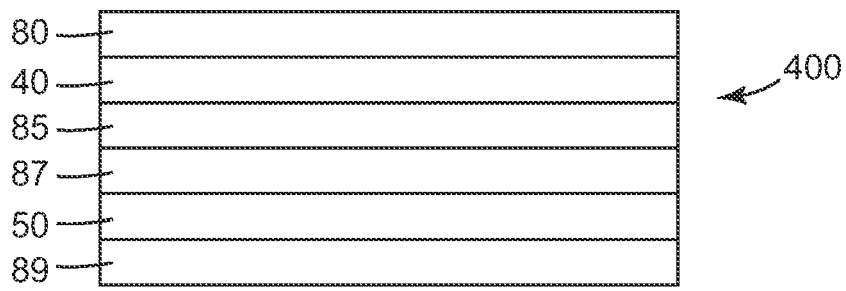
FIG. 4 is a cross-sectional schematic of another embodiment of an optical construction, having more than one buried static-dissipative layer.

Static-dissipative optical constructions according to the invention include a static-dissipative component adjacently positioned between non-static-dissipative optical components such as what is illustrated in FIG. 1. The relative positions of the static-dissipative component in relation to the non-static-dissipative optical components can be such that the static-dissipative component is, for example, buried, sandwiched, covered, overcoated or overlayed by the non-static-dissipative optical components. Referring now to FIG. 1, a multi-layer optical construction 100 is illustrated, having a static-dissipative component 10 positioned between non-static-dissipative materials 50, 55. Non-static-dissipative materials 50, 55 need not be the same material. Optionally, the optical constructions can include additional layers beyond that over a mere overcoat or protective layer for the static-dissipative coating. Such an embodiment is illustrated in FIGS. 2 and 3, where the static-dissipative layer in each construction is buried on at least one side, by more than one non-static-dissipative optical layer. FIG. 2 provides a cross-section of an optical construction 200 having optical layers 60, 65 positioned on interface surface 29 of static-dissipative layer 20. In FIG. 3, a cross-section of an optical construction 300 has a static-dissipative layer 30 surrounded on each side by two layers, where one major surface 32 of static dissipative layer 30 is positioned over non-static-dissipative optical layers 70, 75 and the other major surface 34 is overlayed by coextending optical layers 77, 79. In a further embodiment, FIG. 4 illustrates the cross-section of an optical construction 400 having more than one static-dissipative layer buried within layers of optical layers. Static-dissipative layers 40, 50 are interlaced between optical layers 80, 85, and 89 as shown. Optical layer 87 is optional, but shown here for illustrative purposes. These constructions having a plurality of optical layers that surround the static-dissipative layer may still be able to achieve and retain the static-dissipative properties.

Advantageously, constructions according to the invention can be used for optical articles or devices, where light is intentionally enhanced, manipulated, controlled, maintained, transmitted, reflected, refracted, absorbed, etc. Useful articles, include, but are not limited to, image lenses, ophthalmic lenses, mirrors, displays (e.g. for computers, televisions, etc.), films, glazings (e.g., windshields, windows), video discs, and the like. Constructions according to embodiments of the invention are useful in devices or articles that do not require the static-dissipative layer to be connected to electronic circuitry (e.g., grounding wires, capacitors, resistors, etc.). Various optical articles, however, particularly those useful in the display industry (e.g. LCD and other electronic displays) can be achieved. These can require constructions having high light transmissivity, such as above about 90%, sometimes above about 92%. Other optical display units that can be made from structures of the invention include, for example, a backlit LCD display.

Figure 5:
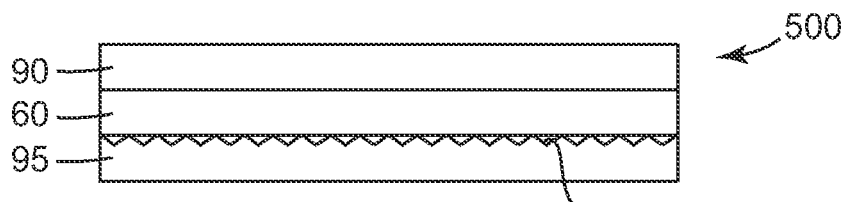
FIG. 5 is a cross-sectional schematic of yet a further embodiment of an optical construction according to the invention.

The optical layers included in exemplary optical constructions according to the invention can serve as a substrate upon which the static-dissipative component is applied, and/or as an overlay positioned to cover, surround, or sandwich the static-dissipative component or layer. As an overlay, an optical layer can be used to protect the static-dissipative component from mechanical abrasions, oxidative degradation, chemical contamination, and other harmful effects. This is particularly advantageous when an optical construction is used in devices or articles that need protection from manufacturing or handling environments. As a substrate, an optical layer can be used to hold or carry a static-dissipative layer that, for example, is applied by coating techniques. In certain constructions of the invention, at least one of the optical layers has some contact with the static-dissipative layer as is illustrated in FIG. 5. An optical layer can also be in substantial contact with the static-dissipative layer. Referring now to FIG. 5, an optical construction 500 is illustrated, having static-dissipative layer 60 positioned between optical layers 90, 95. As shown in the figure optical layer 90 can be in substantial contact with layer 60, while optical layer 95 can be considered to have some or a portion of its surface 97 contacting layer 60. Surface 95 can, for example, have a non-planar topography, yet is capable of achieving an interface with layer 60. The non-planar topography can be regular (e.g., substantially uniform) or irregular (e.g., substantially random).

Any material acceptable and useful in optical constructions and articles can be used for the optical layers. Optical layers are preferably non-static-dissipative. Useful optical layers are generally purely polymeric and can therefore be substantially free of static-dissipative agents, such as agents or additives intentionally included or blended into the polymeric material when the layer was formed. Optical constructions according to embodiments of the invention can also utilize optical non-static-dissipative layers that are substantially free of any static-dissipative agents that have leached or penetrated into the polymeric material.

The non-static-dissipative optical layers in constructions of the invention can be in the form of a coating or a film. When formed by a coating, a non-static-dissipative optical layer can comprise a resin, such as a hardenable or curable resin. Useful resins include acrylic or epoxy-based, but other resins suitable for optical devices or articles can be used. The non-static-dissipative coating is typically cured or dried upon its application over the static-dissipative component. UV curing, for example, can be used to cure the coating composition.

For non-static-dissipative optical layers that are provided in the form of a film, the layer can be made from a variety of materials comprising, for example, polymeric compounds. The film also can be a material made, for example, from a hydrophobic organic polymer with a glass transition temperature value (Tg) of at least 40° C. Other polymers having a Tg value above 100° C. can be useful. The non-static-dissipative optical layer can be a material that falls into any of a variety of optically useful classes of material that have optical functions, such as polarizers, interference polarizers, reflective polarizers, diffusers, colored optical films, mirrors, louvered optical film, light control films, transparent sheets, brightness enhancement film, and the like. The layers can be optically effective over diverse portions of the ultraviolet, visible, and infrared spectra. An example of a suitable optical layer a brightness enhancement film, available under the tradename VIKUITI™ (available from 3M Co.; St. Paul, Minn.). Other highly light transmissive films can be used. The thickness of a non-static-dissipative optical layer can be greater than about 2 µm, and also greater than 5 µm. The layer can also be less than about 10 mm. Typical optical layers will have a thickness of about 75 to about 175 µm. Optional features of non-static-dissipative optical layers in exemplary constructions of the invention include a micro-structured surface, or a multi-layer construction (e.g. multi-layer optical films known as MOFs).

Examples of suitable materials for the non-static-dissipative optical layers in exemplary constructions of the invention can be substrates or films, that include, but are not limited to, a polyester, polyolefin, styrene, polypropylene, cellophane, diacetylcellulose, TAC or cellulose triacetate, acetylcellulose butyrate, polyvinylidene chloride, polyvinyl alcohol, ethylene-vinyl alcohol, syndiotactic polystyrene, polycarbonate, polymethylmethacrylate, polymethylpentene, norbornene resin, polyetherketone, polyethersulfone, polysulfone, polyetherketoneimide, polyimide, fluorine-containing resin, nylon, acryl, polyacrylate, vitreous materials, glass, or combinations thereof. Other materials that are highly transparent and/or highly light transmissive can be used. Films that are easily adaptable to processing, such as polymeric films made of triacetylcellulose (cellulose triacetate) or polycarbonate, may be quite useful.

Optical constructions of the invention include a static-dissipative component that, although is buried or covered, imparts a static dissipative property to the optical construction. The static-dissipative component can be provided in the form of a coating, or a layer, in effective amounts to impart the desirable static dissipative property to a construction, particularly at the article's outermost surface(s). When formed by a coating, the static dissipative layer can have a dry thickness of at least 2 nanometers.

A static dissipative component can be achieved from a composition having a conductive polymer dispersed in an aqueous or organic solvent. Suitable conductive polymers include, but are not limited to, polyaniline and derivatives thereof, polypyrrole, and polythiophene and its derivatives. Useful polymers can include, for example, commercially available conductive polymers such as Baytron™ P (from H.C. Starck; Newton, Mass.). Typically, a conductive polymer can be provided as a dispersion. When applied to a non-static-dissipative optical layer, the conductive polymers generally are not expected to migrate or penetrate into the optical layer.

A static-dissipative composition can also have adhesive properties. Conducting materials suitable for optical use can be included in these conductive adhesives. For example, these conductive materials include any one of indium-tin oxide (ITO) aluminum-tin oxide, silver, gold, and the like, or combinations thereof. These conductive adhesives have use in, for example, LCD displays where a backlight unit includes a wedge-shaped edge-lit light guide that has a reflector on its bottom (non-light output) surface. This reflector can be attached to the light guide using an optically clear conducting adhesive thereby providing a static dissipative backlight unit.

A binder can optionally be included in the static-dissipative composition. Suitable binders are materials that are compatible with the conductive agent or static-dissipating agent (e.g. conductive polymer). Various criteria can be used to characterize suitability of a binder. These include, the binder's ability to form a stable, smooth solution so that lumps and large particles are minimized or eliminated; the binder would not cause precipitates to form; the binder would not reduce the effectiveness of the conductive polymer or agent; and the binder can impart smooth coatability with minimal streaking or reticulation of the coating upon drying. Acrylates, urethanes, epoxides, and combinations thereof are examples of useful optional binders. An acrylic binder can be similar to what has been described in WO 00/73393. Another useful binder is a mixed-acrylate melamine-crosslinked film-forming binder composition, as described in WO01/38448A1. Embodiments of the invention having a conductive coating can even utilize a solution supplied under the tradename CPUD-2™ (available from H.C. Starck) which is a composition that includes the conductive polymer Baytron P™ pre-mixed with a urethane binder.

Other additives that are consistent and compatible with the static-dissipative agent of the static-dissipative layer and compatible with the optical properties of the optical construction can be included in the static-dissipative composition. These include, but are not limited to, coating agents, fillers, dopants, anti-oxidants, stabilizers, and the like.

Exemplary embodiments of the invention can be made using any technique that can position a static-dissipative component between non-static-dissipative optical layers. Some useful processes, include, for example, extrusion, coextrusion, coating, and lamination. In one method according to the invention, a static-dissipative optical construction can be made by contacting (such as by coextrusion or lamination), a static-dissipative layer with optical layers to surround or sandwich the static-dissipative layer. A coextrusion process can, for example, form a static-dissipative layer at the same time as the optical layers. Certain conductive polymers may need to be present in a composition in large concentrations in order for the layers to be formable by bulk-melt techniques. Thus, extrusion or a melt-distribution of a composition having a conductive polymer may require additional steps or modifications so that the conductive polymeric compositions can form optically acceptable layers, rather than undesirable, deeply colored layers. With certain modifications, the compositions can be formulated to be melt-compatible and therefore provide effectively thin, static-dissipative layers.

In another embodiment, a method of making a static-dissipative optical construction can be accomplished by applying an effective amount of a static-dissipative composition on a surface of a non-static-dissipative optical layer and then positioning another non-static-dissipative layer over the static-dissipative composition. Applying the static-dissipative composition can be performed using a coating technique. Optionally, a primer can be applied onto all or some part of a non-static-dissipative optical layer, and can be applied prior to applying the static-dissipative composition. Another optional step in the process is forming a micro-structured surface on any of the optical layers.

A number of embodiments of the invention have been described. Nevertheless, it will be understood that various modifications may be made without departing from the spirit and scope of the invention. The invention will now be described by way of the following non-limiting examples. These are provided to illustrate different embodiments and details of such. The components and amounts used, as well as other conditions and details are not intended to limit the scope of the invention

EXAMPLES

As used herein, the terms "solution," "dispersion," and "mixture" are generally synonymous. These terms to refer to a generally uniform admixture of components on a macro scale (e.g. visually) and are not intended to connote a particular state of solubility, particle size or distribution of the components. Unless otherwise specified, all percentages are in weight percent.

Test Methods

Surface Resistivity

Surface resistivity of samples was determined using a Model 872 Wide Range Resistance Meter and a Model 803B Concentric Ring Resistance/Resistivity Probe both sold by ETS, Glenside, Pa., according to the manufacturer's directions.

Static Decay

Time for decay of surface static charge was determined using an ETS Model 406C Static Decay Meter according to the manufacturer's directions. Results stated herein reflect the time required to dissipate an initial surface charge of 5000 volts to 500 volts (i.e., decrease down to 10% of the original value), and are reported as "Static Decay Time."

Particle Pick-Up Test

In order to determine whether samples having similar surface resistivity or static decay times react differently in the presence of particulate matter, a use-oriented Particle Pick-up Test was devised.

Fine grade vermiculite having an average particle dimension of about 1 mm, was placed at the bottom of a cylindrical plastic container of about 3 inch (750 mm) diameter to form a generally uniform layer of about 0.25 inch (6 mm) high.

Samples to be tested were rubbed with a material known to induce static charges on a surface such as, for example, clean dry human hair, cat fur or wool fabric. A coated film sample was gently, randomly rubbed for about 3-5 seconds against a charge inducing material to induce a static charge on the film. The charged film was then positioned on top of the vermiculite container.

The gap between the surface of the vermiculite particles and the surface of the charged film was chosen to be either 0.75 inch (19 mm) or 0.5 inch (12.5 mm). A 0.75 inch (19 mm) gap was achieved by selecting a container with a 1 inch (25 mm) wall height. A 0.5 inch (12.5 mm) gap was achieved by selecting a container with a 0.75 inch (19 mm) wall height.

For convenience, the following terms and abbreviations are used in the examples.

| | |
|---|---|
| MAB | An acrylate core-shell film-forming binder composition described below. |
| IBOA | Isobornyl acrylate monomer, e.g., Aldrich Cat. No. 39,210-3 |
| MMA | Methyl methacrylate monomer, e.g., Aldrich Cat. No. M5,590-9 |
| EA | Ethyl acrylate monomer, e.g., Aldrich Cat. No. E970-6 |
| HEMA | Hydroxyethyl methacrylate monomer, e.g., Aldrich Cat. No. 47,702-8 |
| GMA | Glycidyl methacrylate |
| NMP | N-Methyl-2-pyrrolidinone, a common solvent |
| BP | Aqueous conductive polymer dispersion. Poly(3,4-ethylenedioxythiophene) poly(styrenesulfonate) aqueous dispersion sold by H. C. Starck, Newton, MA, under the tradename "Baytron P". BP as purchased is understood to contain 1.3% by weight of conductive polymer. |
| CPUD-2 | Baytron Conductive Polyurethane Dispersion II (Baytron CPUD2); An aqueous dispersion of poly(3,4-ethylenedioxthiophene)/poly(styrenesulfonic acid)/polyurethane/triethylamine/1-methyl-2-pyrrolidinone (H. C. Starck; Newton, MA) |
| D1012W | ORMECON D1012 W water-based polyaniline dispersion (Ormecon Chemie GmbH; Ammersbek, Germany) |
| PET | Polyethylene terephthalate film |
| DBEF | VIKUITI ™ Brightness Enhancement Film - a polyester reflective polarizer film (3M Co.; St Paul, MN). |
| DBEF-M | VIKUITI ™ Brightness Enhancement Film having a matte surface on one side of the film. (3M; St. Paul, MN). |
| Triton X-100 | Nonionic surfactant (Aldrich Chemical Co.) |

Preparation of MAB

A core-shell latex composition comprising a core/shell ratio of 40/60 was prepared according to the method described in U.S. Pat. No. 5,500,457, Example 1A. The core monomer premix weight ratio was IBOA/MMA/EA/HEMA=10/10/75/5. The shell monomer premix weight ratio was IBOA/MMA/EA/HEMA=35/40/20/5. All other ingredients and conditions used in the preparation were as described. The resultant core-shell latex yielded 34 wt % non-volatile content.

A GMA copolymer composition was prepared as described in U.S. Pat. No. 4,098,952, Example 3. The resultant copolymer composition yielded 29 wt % non-volatile content.

MAB was prepared by mixing 67.6 g core-shell latex composition, 144 g GMA copolymer composition, 15 g of a 10% solution of Triton X-100, and 773.4 g deionized water to yield a composition containing 6.6% by weight non-volatile content.

Example 1

A static dissipative film was prepared by coating a conductive polymer layer onto a non-conductive substrate, and overcoating the conductive polymer layer with a non-conductive overcoat. A conductive polymer mixture was prepared by adding 16 grams of Baytron P dispersion ("BP") to 84 grams of water with stirring and then adding 0.5 grams of NMP. The conductive polymer mixture was coated by wire-wound rod onto 0.005 inch (0.125 mm) corona-primed transparent PET substrate to a wet thickness of 0.00027 inch (0.0068 mm). The coated substrate was subsequently dried in a forced air oven at 100 C. for 1 minute. A UV-curable acrylic resin, described in U.S. Pat. No. 5,908,847 (Example 1), was warmed to 55 C. and poured onto the BP coated surface of the film. A tool bearing a microstructured surface was placed onto the liquid acrylic resin coat. The "sandwich" thus formed was pulled through a knife coater adjusted to provide a final microstructured acrylic layer thickness of about 5-25 microns. This sandwich was then cured through the PET substrate side on a Lesco C2020 UV processor (Torrance, Calif.) using two 300 watt Fusion "D" bulbs at 100 percent power at a distance of about 6 inches (150 mm) from the sandwich. The sandwich was put through the processor twice at a line speed of 15 feet/min to ensure thorough cure of the acrylic resin. The microstructured tool was peeled from the sandwich to provide a static dissipative film having a microstructured surface. Both the acrylic surface and the PET surface of this film had a surface resistivity of at least $1 \times 10^{13}$ ohms/square but had a static decay time of 0.01 second.

Example 2

A static dissipative film was prepared in accord with Example 1 except using a conductive polymer mixture prepared as follows: 2.5 grams of BP dispersion were added to 90.3 grams of deionized water with mixing. To this mixture, with continued stirring were added 6.2 grams of MAB, 0.5 grams of NMP and 0.5 grams of a 10% aqueous solution of Triton X-100. Both the acrylic surface and the PET surface of this film had a surface resistivity of at least $1 \times 10^{13}$ ohms/square but had a static decay time of 0.01 second.

Example 3

A static dissipative film was prepared in the manner of Example 2 except no NMP was added to the MAB mixture. Both the acrylic surface and the PET surface of this film had a surface resistivity of at least $1 \times 10^{13}$ ohms/square but had a static decay time of 0.01 second.

Example 4

A static dissipative film was prepared in the manner of Example 3 except that 2.5 grams CPUD-2 dispersion was added in place of the Baytron P dispersion. Both the acrylic surface and the PET surface of this film had a surface resistivity of at least $1 \times 10^{13}$ ohms/square but had a static decay time of 0.01 second.

Example 5

A conductive polymer mixture was prepared by mixing together 265 grams MAB solution, 212.5 grams Baytron P, 85 grams NMP, 85 grams 10% Triton X-100 in water, and 16352 grams of water. Using a wire wound rod, this mixture was coated onto a 0.005 inch (0.125 mm) DBEF-M reflective polarizer film which had been previously corona treated in air to yield a 0.001 inch (0.025 mm) wet thickness. The sample was then dried in a forced air oven at 170 F. (75 C.) for approximately 1 minute. For this coated film intermediate, surface resistivity of the MAB/BP coated side was $1 \times 10^7$ ohms/square whereas surface resistivity of the uncoated polyester side was greater than $1 \times 10^{13}$ ohms/square. Electrostatic decay times for either side of this film were 0.01 seconds. To prepare a static dissipative film as an embodiment of the invention, each side of the coated film intermediate was laminated to a 0.005 inch (0.125 mm) transparent polycarbonate film (available from Bayer US; Pittsburgh, Pa.) using a 0.001 inch (0.025 mm) layer of optical adhesive. Surface resistivity of each PC side was at least $1 \times 10^{13}$ ohms/square but both sides of the film had a static decay time of 0.01 second. During the Particle Pick-up Test, this construction did not attract particulate matter when placed over the bed of vermiculite.

Example 6

A coated film intermediate as in Example 5 was prepared. Onto the MAB/BP surface was laminated 0.00125 inch (0.03 mm) Soken 1885 transfer adhesive (Soken Chemical and Engineering Co, Tokyo, Japan). A sheet of ⅛ inch (3.2 mm) poly(methylmethacrylate) (commonly available under the tradename "Plexiglass") was then laminated to the adhesive surface. Results were observed to be substantially similar to that of Example 5.

Example 7

A static dissipative film was prepared in the manner of Example 5 except the PC film laminated to the MAB/BP side of the coated film intermediate was 0.010 inch (0.25 mm) transparent Bayer PC whereas the PC film laminated to the polyester side of the coated film intermediate was 0.008 inch (0.2 mm) transparent PC film available from GE Plastics, Pittsfield, Mass. Surface resistivity of each PC side was at least $1 \times 10^{13}$ ohms/square but both sides of the film had a static decay time of 0.01 second. During the Particle Pick-up Test, this construction did not attract particulate matter when placed over the bed of vermiculite.

Example 8

A static dissipative film was prepared in the manner of Example 5 except the substrate was DBEF having an integral matte surface (sold under the tradename VIKUITI™ by 3M, St Paul, Minn.) and the outer layers were polyolefin instead of polycarbonate. Thus, MAB/BP mixture was coated onto the matte surface of the substrate and dried as described in Example 5. Approximately 0.00125 inch (0.03 mm) Soken 1885 transfer adhesive (Soken Chemical and Engineering Co.; Tokyo, Japan) was laminated onto the MAB/BP surface. Polyolefin film having a thickness of 0.0019 inch (0.027 mm) was then laminated to the adhesive. Surface resistivity of the static dissipative film was at least $1 \times 10^{13}$ ohms/square on each of the polyolefin or the DBEF sides but both sides of the film had a static decay time of 0.01 second.

Example 9

A conductive polymer mixture was prepared by mixing 0.8 grams of D1012W dispersion with 17 grams of water containing 0.5 grams of 10% Triton X-100. This mixture was coated onto 0.005 inch (0.125 mm) corona treated PET film using a wire wound rod to produce a 0.001 inch (0.025 mm) wet film. The coating film was dried at 100 C. for approximately 2 minutes. The surface resistivity of the dried conductive polymer coating was $5.2 \times 10^9$ ohms/sq. A static dissipative film was then made by laminating the conductive polymer film between two 0.005 inch (0.125 mm) layers of polyester film each having a 0.003 inch (0.075 mm) coating of pressure sensitive adhesive on one side. The static decay time was 0.02 seconds. The surface resistivity of either side of this static dissipative film was greater than $1 \times 10^{12}$ ohms/sq.

Example 10

A conductive polymer film was prepared using a polypyrrole solution described as a conductive polymer doped with proprietary organic acids obtained from Aldrich Chemical Company as Catalog Number 48,255-2 supplied as a 5% solution in water. The polypyrrole solution, without further modification, was coated onto 0.005 inch (0.125 mm) corona treated DBEF-M film using a wire wound rod to produce a 0.001 inch (0.025 mm) wet film. The coating film was dried at 100 C. for approximately 2 minutes. The surface resistivity of the dried conductive polymer coating was $2.8 \times 10^7$ ohms/sq. A static dissipative film was then made by laminating the conductive polymer film between two 0.005 inch (0.125 mm) layers of polyester film each having a 0.003 inch (0.075 mm) coating of pressure sensitive adhesive on one side. The static decay time was 0.01 seconds. The surface resistivity of either side of this static dissipative film was greater than $1 \times 10^{12}$ ohms/sq.

What is claimed is:

1. A method of making a static-dissipative optical construction comprising:
   providing a non-static-dissipative optical substrate;
   applying a static-dissipative composition on a major surface of said non-static-dissipative optical substrate, wherein the composition comprises a conductive polymer; and
   positioning a non-static-dissipative layer over said static-dissipative composition, wherein the construction has a light transmissivity greater than 90% and a surface resistivity greater than $1 \times 10^{13}$ ohms/sq.

2. The method according to claim 1 further comprising:
   applying a primer onto at least a portion of the major surface of said non-static-dissipative optical substrate.

3. The method according to claim 1 further comprising forming a micro-structured surface.

4. The method according to claim 1, wherein the construction exhibits a static decay time of less than 2 seconds.

5. The method according to claim 1, wherein the construction exhibits a static decay time of less than about 0.5 seconds.

6. The method according to claim 1, wherein the construction exhibits a static decay time of less than about 0.1 seconds.

7. The method according to claim 1, wherein the static-dissipative composition further comprises a binder.

8. The method according to claim 7, wherein the binder comprises a material selected from a group consisting of acrylate, melamine, urethane, and combinations thereof.

9. The method according to claim 1, wherein at least one of the non-static-dissipative optical substrate and the non-static-dissipative layer is a film comprising a material selected from a group consisting of polyvinyl chloride, polyethylene, polyethylene naphthalate, polyurethane, polyethylene acrylic acid, polypropylene, polyester, polycarbonate, poly(methyl methacrylate), polyvinylidene fluoride, polyether, a polyimide, a polyamide, and blends thereof.

10. The method according to claim 1, wherein at least one of the non-static-dissipative optical substrate and the non-static-dissipative layer is a hardenable resin.

11. The method according to claim 1, wherein at least one of the non-static-dissipative optical substrate and the non-static-dissipative layer comprises a micro-structured surface.

12. The method according to claim 1, wherein at least one of the non-static-dissipative optical substrate and the non-static-dissipative layer comprises a multi-layer film.

13. The method according to claim 1, wherein at least one of the non-static-dissipative optical substrate and the non-static-dissipative layer is a material selected from a group consisting of polarizers, diffusers, reflectors, colored films, mirrors, louvered optical film, and brightness enhancement film.

14. The method according to claim 1, wherein the static-dissipative layer is a conductive coating.

15. The method according to claim 14, wherein the coating has a dry thickness of at least 2 nanometers.

16. The method according to claim 14, wherein the conductive coating is an adhesive.

17. The method according to claim 1, further comprising at least one additional optical layer contacting a major surface of the non-static-dissipative optical substrate and the non-static-dissipative layer.

* * * * *